Patented Nov. 7, 1939

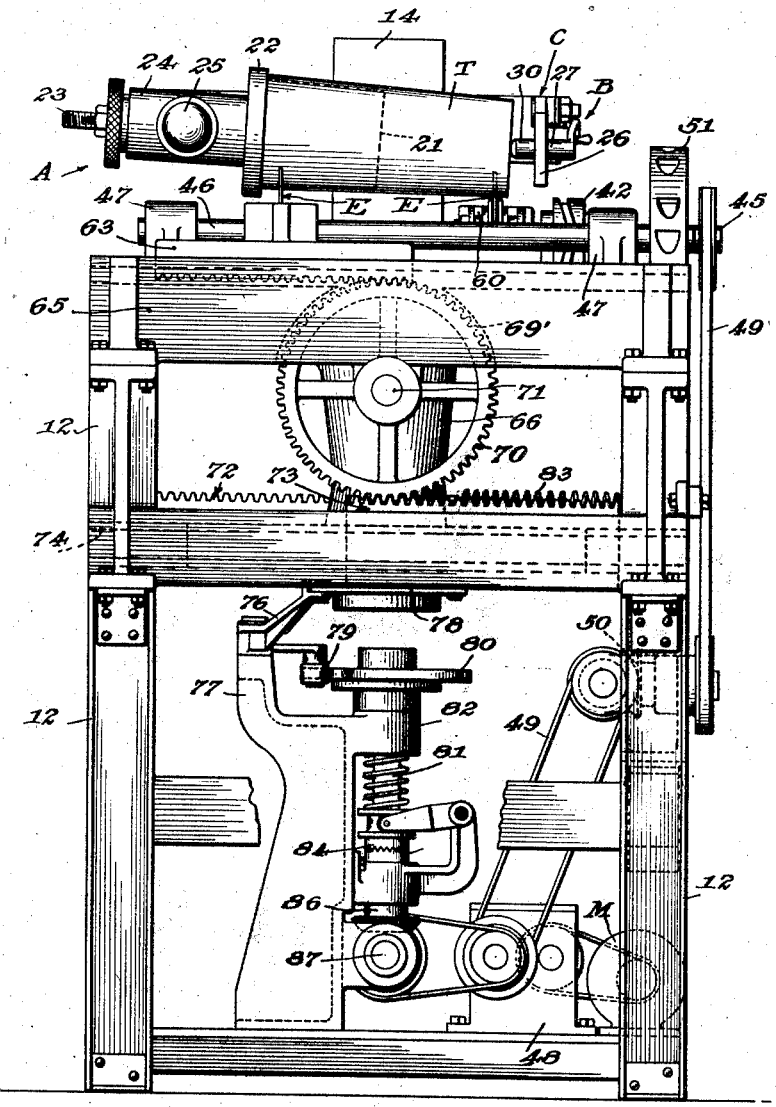

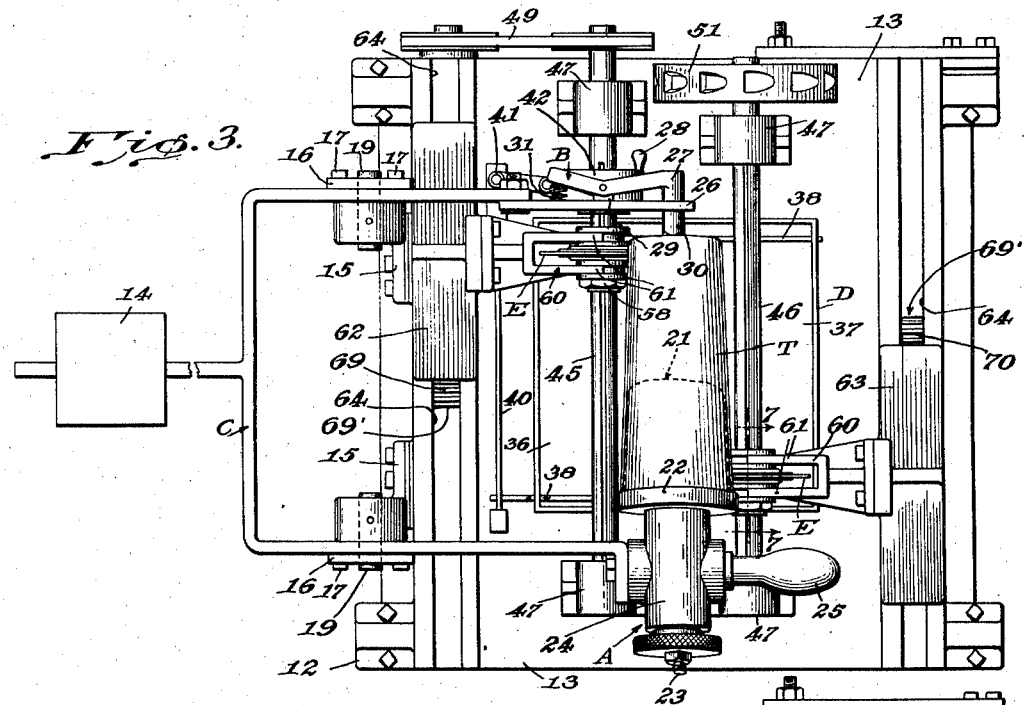

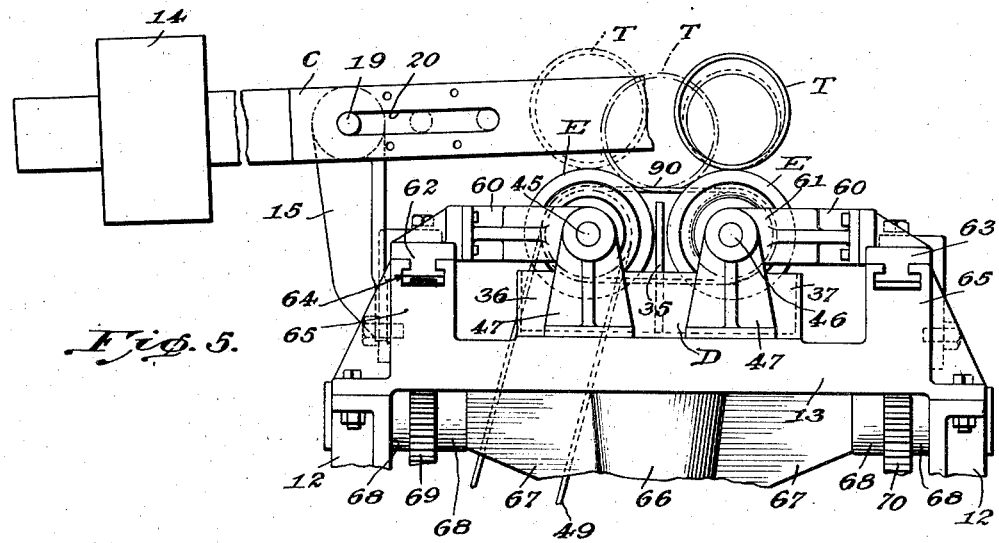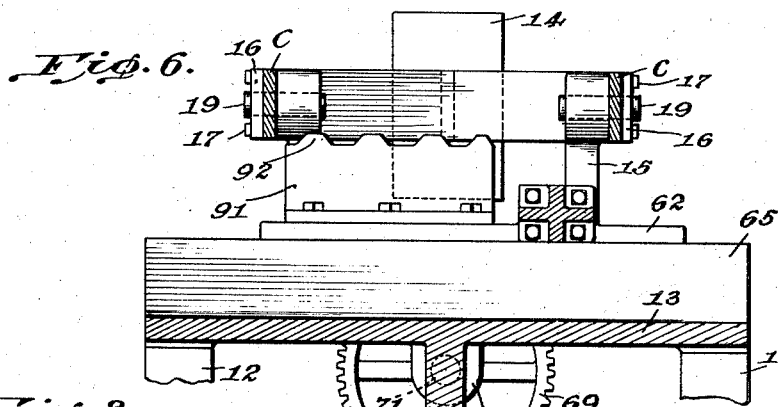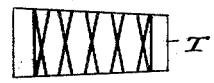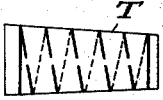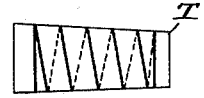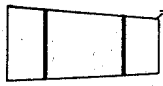

2,179,221

UNITED STATES PATENT OFFICE 2,179,221

BANDING MACHINE

Henry W. Schneider and Lawrence O. Mankin, Toledo, Ohio, assignors to Libbey Glass Company, a corporation of Ohio Application September 9, 1937, Serial No. 163,110

12 Claims. (Cl. 91—12)

The present invention relates to an apparatus for banding or decorating articles.

The principal object of the invention is to provide an apparatus for automatically decorating tumblers and similar articles which will apply to the articles a closed band or series of closed bands of similar or contrasting colors, a right or left-hand continuous or interrupted spiral band or series thereof, or any combination or multiple of such closed, interrupted or spiral bands.

The machine comprising the present invention is designed as an improvement over the type of banding machine disclosed in United States reissue patent to Harold R. Schutz, 20,277, February 23, 1937.

Other objects of the invention will become apparent hereinafter.

In the accompanying drawings:

Fig. 2 is a side elevational view thereof;

Fig. 3 is a top plan view thereof;

Fig. 4 is a sectional view taken substantially along the line 4—4 of Fig. 1;

Fig. 5 is an enlarged fragmentary front elevational view of the machine illustrating the manner in which a single spiral band is applied or a plurality of parallel spiral bands are applied to the surface of a tumbler;

Fig. 6 is a sectional view taken substantially along the line 6—6 of Fig. 1 but showing a modified form of structure for applying interrupted spiral bands to tumblers;

Fig. 7 is a sectional view taken substantially along the line 7—7 of Fig. 3; and Figs. 8, 9, 10, 11, 12 and 13 are diagrammatic views showing different banded designs applied to respective tumblers by the machine.

Figure 1:
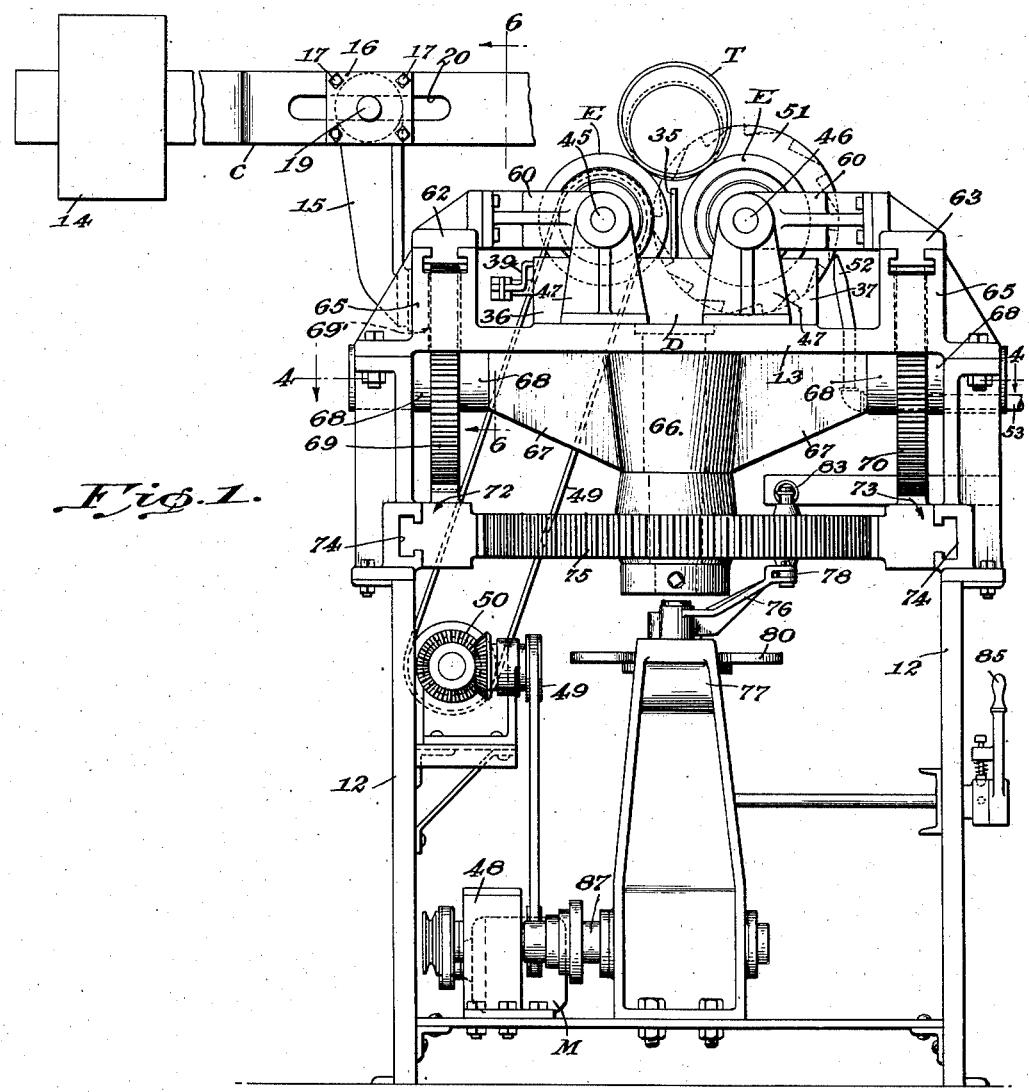
Fig. 1 is a front elevational view of a banding machine embodying the principles of the present invention.

Referring to Fig. 3, briefly, the essential elements of the banding machine comprise a chuck assembly A for receiving tumblers T to be banded, a locking mechanism B for holding the tumblers T on the chuck, an adjustable frame C on which the chuck and locking mechanism are mounted, a partitioned reservoir D adapted to contain differently colored decorating enamels, and a series of banding disks E rotatably and slidably mounted upon respective shafts between the chuck assembly and reservoir.

In detail, the machine involves in its general organization a supporting framework 12 including a table portion 13. The frame C is in the form of a yoke (Fig. 3) at one end of which are mounted the chuck assembly A and locking mechanism B and on the other end of which is slidably mounted a counterweight 14. The frame C is pivoted medially of its ends to a pair of brackets 15 by means of bearing plates 16 (Fig. 1) which are removably secured by cap screws 17 to the frame C. Trunnions 19, secured in the brackets 15, extend centrally through slots 20 formed in the frame C and through the plates 16 and form the pivotal connection for the frame.

The chuck assembly A comprises a tapered cylinder 21 (Fig. 3) or chuck over which the tumbler to be decorated is placed with its rim bearing against an abutment flange 22. The chuck 21 is mounted upon a shaft 23 which is supported in a ball-bearing assembly 24 secured to the forward end of the frame C at one side thereof and from which there projects a handle 25.

The locking mechanism B comprises a supporting arm 26 which is pivoted to the forward end of the frame C at the other side thereof and which extends to a point adjacent the small end of the chuck 21. A locking lever 27 carrying a handle 28 is pivoted medially of its ends to a bracket 29 on the arm 26 and one end thereof is bent laterally and is provided with a spherical bearing surface 30. A coil spring 31 positioned between the other end of the lever 27 and the arm 26 causes the bearing surface 30 to press against the bottom of the tumbler T to maintain the same on the chuck. By means of the handle 28, the lever 27 may be moved horizontally so as to bring the bearing surface 30 out of contact with the tumbler T and then swung upwardly together with the arm 26 in order that substitution of tumblers on the chuck may be effected.

The reservoir D is supported upon the table portion 13 directly beneath the chuck assembly A. A partition 35 (Fig. 1) extending centrally across the reservoir parallel to the axis of the chuck 21 divides the reservoir into two containers 36 and 37 adapted to contain differently colored enamels.

A pair of agitators 38 (Fig. 3) for the liquid enamels are pivoted in the side walls of the reservoir D and depend into the respective containers 36 and 37. Crank arms 39 formed on the agitators 38 exteriorly of the reservoir are attached to a connecting rod 40 which is actuated by an oscillating lever 41 which is in turn actuated through a pin and slot connection from a cam cylinder 42 mounted on a shaft 45 as is more clearly shown in the above mentioned Schutz patent.

The shaft 45 and a shaft 46 (Figs. 1, 2 and 3) are positioned between the chuck assembly A and the reservoir D, extend transversely of the machine, overlie the respective containers 36 and 37, and are journalled in bearing supports 47 secured to the table 13. The shaft 45 is positively driven from a gear reduction device 48 and motor M through a system of belts and pulleys 49 and gearing 50. The shaft 46 is adapted to receive its motion by contact with the tumbler T on the chuck 21, but during substitution of tumblers is kept in motion by means of a turbine 51 mounted thereon which derives its motion from a jet 52 connected to a source 53 of compressed air. Thus a yielding torque may be said to be constantly applied to the shaft 46 to yieldingly continuously rotate the same for a purpose that will presently appear.

Each shaft 45 and 46 has slidably keyed thereto a sleeve 44 (Fig. 7) upon which is mounted one of the banding disks E. Each disk is in the form of a steel ring, the outer peripheral edge of which has a width corresponding to the width of the spiral band to be applied to the tumbler T. The disk E is frictionally held between a pair of disks 54 which are clamped to the opposite sides of a hub 55 between a circumferentially grooved flange 56 formed on the sleeve and a similarly grooved collar 57 by means of a clamping nut 58. A curved band spring 59 positioned between the hub 55 and disk E permits the disk to yieldingly bear against the surface of the tumbler and automatically compensate for any irregularity in the surface of the tumbler. The disks E dip into the enamel composition contained in the respective containers 36 and 37 of the reservoir D.

When the frame C and chuck assembly A are in decorating position, the tumbler T on the chuck 21 is nested between the two banding disks E on the shafts 45 and 46 respectively. Means is provided for sliding the rotating disks E longitudinally of their respective shafts in opposite directions to simultaneously apply ascending and descending spiral bands to the surface of the tumbler as shown in Fig. 10. Accordingly, the sleeves 44 are each movable longitudinally of the shafts 45 and 46 under the impelling action of a bifurcated bracket 60 (Figs. 3 and 7) having forks 61 which straddle the grooved flange 56 and grooved collar 57. The brackets 60 are secured to carriages 62 and 63 or rack bars which are mounted in slideways 64 provided in upstanding ribs 65 formed on the table 13 at opposite sides thereof.

A central bearing 66 is formed integrally with and depends from the table 13 and is provided with webs 67 having bearings 68 formed at their outer ends. Slots 65' (Figs. 1 and 2) formed in the ribs 65 provide clearance for a pair of rack shifting gears 69 and 70 which are mounted on shafts 71 supported in the bearings 68 and which mesh in their upper regions with rack bars 62 and 63 respectively. The gears 69 and 70 mesh in their lower regions with horizontal teeth provided on a pair of rack bars 72 and 73 mounted in slideways 74 formed in the framework 12. An oscillating gear 75, suspended from the hub 66, bridges the distance between the rack bars 72 and 73, meshes with the vertical teeth provided on the same, and serves to impart reciprocal motion thereto in an opposite direction upon oscillation of the former.

The gear 75 is oscillated by means of an oscillating bell crank lever 76 (Fig. 2) mounted upon the upper end of a standard 77. One arm of the lever 76 is connected by a link 78 to an eccentric point on the gear 75 while the other end thereof is provided with a cam roller 79 which is in contact with the surface of a rotating cam plate 80 (Figs. 2 and 4) secured to a shaft 81 rotatably mounted in a bearing 82 formed on the standard 77. A spring 83 serves to restore the gear 75 to its initial position and thus cause the roller 79 to bear against the rotating cam plate 80. A clutch mechanism 84, the operation of which is controlled by a manually operated lever 85 (Fig. 1) serves to throw the shaft 81 into or out of operative driving relation with a drive shaft 86 which receives its rotary motion from a jack shaft 87 driven from the gear reduction device 48.

It is to be noted that during the simultaneous application of spiral bands to the tumblers, the two banding wheels E rotate in the same direction but the disk on the shaft 45 applies a right spiral while the disk on the shaft 46 applies a left spiral band and vice versa during alternate decorating operations. If both bands are of uniform color, it is obvious that successive tumblers issuing from the machine will be uniformly decorated. Where contrasting colors are employed, alternately discharged tumblers will be uniformly decorated.

During the decorating operation both banding disks E dip into the enamel composition in the reservoir D and the disks become coated in their peripheral regions. The enamel composition adhering thereto is transferred to the tumblers by contact of the edge of the disk to the latter. In order that the decorating operation may commence precisely at the moment when the disk on the shaft 46 contacts the tumbler and in order that the enamel composition shall at all times be more or less evenly distributed on the periphery of the disk, the jet 52 discharges air against the turbine 51 continuously.

When it is desired to band the tumblers T uniformly with either a single right or left spiral band, the bearing plates 16 (Fig. 1) are removed, the shafts 45 and 46 are connected together and driven in unison by a suitable belt and pulley connection 90 as shown in Fig. 5, while at the same time the supply of air to the jet 52 is discontinued. The frame C is thus pivoted to the brackets 15 by the floating connection provided by the pin and slot connection 19, 20. The tumblers are alternately decorated on the two disks E by shifting the position of the frame C after each decorating stroke from the full line position to the dotted line position and vice versa. In both instances a right spiral band as shown in Fig. 11 will be applied to the tumbler.

The application of left spiral bands to the tumblers as shown in Fig. 12 is accomplished with the same machine set-up just described and may be attained merely by reversing the sequence of tumbler application to the disks E.

The application of parallel spiral bands of contrasting colors as shown in Fig. 8 is likewise accomplished with the same machine set-up with differently colored enamels in the containers 36 and 37. It is merely necessary to allow each tumbler to remain in the machine for a second color application, i. e., the two disks E are caused to operate successively on each tumbler, the disks being situated on their respective shafts 45 and 46 in a position calculated to give the desired band spacing.

The application of an interrupted spiral band as shown in Fig. 9 may be accomplished by the incorporation in the machine of a plate 91 (Fig. 6)

which is secured to the sliding rack bar 62. The plate 91 is provided with a series of frame lifting cams 92 which, upon operative decorating travel of the bar 62, successively engage the underneath side of the frame C and momentarily elevate the same to remove the tumbler undergoing decoration from contact with the banding disk E.

By employing the bearing plates 16 and thus shifting the position of the frame C so that the tumblers T contact the peripheries of both banding disks when the same are interconnected as shown by the broken line position of the tumbler in Fig. 5, and by disengaging the clutch mechanism 84, closed bands of different colors may be applied to the tumbler as shown in Fig. 13. A single band may be applied to the tumbler by shifting the position of the frame C so that the tumbler engages the periphery of a single disk E regardless of which one it may be.

Modifications may be resorted to within the spirit and scope of the appended claims.

We claim:

1. A multi-color banding machine comprising a pair of independently rotatable shafts, a banding disk on each shaft and rotatable therewith, means for supplying differently colored decorating material to said disks respectively, means movable toward and away from said disks for supporting an article having a substantially cylindrical surface in contact with said disks simultaneously, means for rotating one of said shafts continuously, and means for constantly applying a yielding torque to the other shaft.

2. A banding machine comprising a rotatable shaft, a banding disk slidably keyed to said shaft and rotatable therewith, a reservoir into which the disk extends, means movable toward and away from the disk for rotatably supporting an article having a substantially cylindrical surface, means for continuously rotating said shaft, and means for sliding the disk longitudinally of said shaft.

3. A banding machine comprising a pair of independently rotatable parallel extending shafts, a banding disk slidably mounted on each shaft and rotatable therewith, a container for supplying decorating material to each disk and into which the disk extends, means movable toward and away from said disks for supporting an article having a substantially cylindrical surface in contact with both of said disks simultaneously, means for driving one of said shafts continuously, and means for sliding said disks longitudinally of their respective shafts.

4. A banding machine comprising a pair of independently rotatable parallel extending shafts, a banding disk slidably mounted on each shaft and rotatable therewith, a container for supplying decorating material to each disk and into which the disk extends, means movable toward and away from said disks for supporting an article having a substantially cylindrical surface in contact with both of said disks simultaneously, means for driving one of said shafts continuously, and means for sliding said disks longitudinally of their respective shafts in timed relation to the rotation of the driving shaft.

5. A banding machine comprising a pair of independently rotatable parallel extending shafts, a banding disk slidably mounted on each shaft and rotatable therewith, a container for supplying decorating material to each disk and into which the disk extends, means movable toward and away from said disks for supporting an article having a substantially cylindrical surface in contact with both of said disks simultaneously, means for driving one of said shafts continuously, means for sliding said disks longitudinally of their respective shafts in timed relation to the rotation of the driving shaft, and means for constantly applying a yielding torque to the other shaft.

6. A banding machine comprising a rotatable shaft, a banding disk slidably mounted on said shaft and rotatable therewith, a reservoir into which the disk extends, means for rotatably supporting an article having a substantially cylindrical surface in contact with said disk, means for rotating said shaft, means for sliding said disk longitudinally of said shaft, and means operable upon sliding of the disk for periodically elevating said article from contact with said disk.

7. A banding machine comprising a pair of independently rotatable shafts, a banding disk slidably mounted on each shaft and rotatable therewith, a container for supplying decorating material to each disk and into which the disk extends, means movable toward and away from said disks for supporting an article having a substantially cylindrical surface in contact with said disks simultaneously, means for driving one of said shafts continuously, means for sliding said disks longitudinally of their respective shafts in timed relation to the rotation of said driven shaft, and means operable upon sliding of said disks for momentarily elevating said article from contact with said disks.

8. A banding machine for tumblers comprising a pair of independently rotatable parallel shafts, a banding disk slidably mounted on each shaft and rotatable therewith, a container for supplying decorating material to each disk and into which the disk extends, means movable toward and away from said disks for supporting a tumbler in contact with said disks simultaneously, means for driving one of said shafts continuously, a pair of rack bars parallel to said shafts, slideways therefor, a gear disposed between said rack bars and meshing therewith, means connecting said rack bars with respective disks whereby said disks follow the movement of said rack bars, and means for oscillating said gear.

9. A banding machine for tumblers comprising a pair of independently rotatable parallel shafts, and rotatable therewith, a container for supplying decorating material to each disk and into which the disk extends, means movable toward and away from said disks for supporting a tumbler in contact with said disks simultaneously, means for driving one of said shafts continuously, a pair of rack bars parallel to said shafts, slideways therefor, a gear disposed between said rack bars and meshing therewith, means connecting said rack bars with respective disks whereby said disks follow the movement of said rack bars, a driving shaft, a driven shaft, clutch instrumentalities connecting said latter shafts, a cam on said driven shaft, a bell crank lever, one arm of said lever being connected to an eccentric point on said gear, and a cam roller on the other arm of said lever in contact with said cam.

10. A banding machine for tumblers comprising a pair of rotatable parallel shafts, a banding disk slidably mounted on each shaft and rotatable therewith, a container for supplying decorating material to each disk and into which the disk extends, a rotatable tumbler-supporting chuck movable toward and away from said disks, means connecting said shafts for driving the same in unison, and means whereby the position of the chuck may be adjustably shifted transversely of the shafts for selective contact of a tumbler thereon with either of said banding disks.

11. A banding machine for tumblers comprising a pair of parallel shafts mounted for rotation independently of each other, a banding disk slidably mounted on each shaft and rotatable therewith, a container for supplying decorating material to each disk and into which the disk extends, a rotatable tumbler-supporting chuck movable toward and away from said disks, means for driving one of said shafts, and means whereby the position of the chuck may be adjustably shifted transversely of the shafts for selective contact of a tumbler thereon with the disk on the driven shaft or with both of the disks.

12. A banding machine for tumblers comprising a pair of parallel shafts mounted for rotation independently of each other, a banding disk slidably mounted on each shaft and rotatable therewith, a container for supplying decorating material to each disk and into which the disk extends, a rotatable tumbler-supporting chuck movable toward and away from said disks, means for driving one of said shafts, means whereby the position of the chuck may be adjustably shifted transversely of the shafts for selective contact of a tumbler thereon with the driven shaft or with both of the shafts, and means for sliding said disks longitudinally of their respective shafts in timed relation to the rotation of the driven shaft.

HENRY W. SCHNEIDER.
LAWRENCE O. MANKIN.